United States Patent [19]

Parsons, Jr.

[11] 4,241,565
[45] Dec. 30, 1980

[54] BOOM MOWER MOUNTING FRAME FOR OVER CENTER TRANSPORT

[76] Inventor: Ralph L. Parsons, Jr., 1795 Olmstead Rd., West Jefferson, Ohio 43162

[21] Appl. No.: 45,241

[22] Filed: Jun. 4, 1979

[51] Int. Cl.³ .......................................... A01D 35/28
[52] U.S. Cl. ...................................... 56/10.7; 56/233
[58] Field of Search ................. 56/10.4, 328 R, 10.7, 56/235, 237, 233; 182/2

[56] References Cited

U.S. PATENT DOCUMENTS

| | | | |
|---|---|---|---|
| 2,360,654 | 10/1944 | Day | 182/2 |
| 2,926,480 | 3/1960 | Kimball | 56/235 |
| 2,940,539 | 6/1960 | Richey | 56/328 R |
| 2,996,196 | 8/1961 | Podlesak | 182/2 |
| 2,997,835 | 8/1961 | Stewart | 56/10.7 |
| 3,061,996 | 11/1962 | Ripps | 56/10.7 |
| 3,087,296 | 4/1963 | Cowles | 56/10.7 |
| 3,236,036 | 2/1966 | Bailey et al. | 56/10.7 |
| 3,301,346 | 1/1967 | Verrell et al. | 182/2 |
| 3,559,385 | 2/1971 | Eaton | 56/10.7 |
| 3,624,698 | 11/1971 | Storm | 56/10.7 |
| 4,074,510 | 2/1978 | Teagle | 56/233 |

*Primary Examiner*—Paul J. Hirsch
*Attorney, Agent, or Firm*—Millard, Cox & Smith

[57] ABSTRACT

Disclosed is a combination of a frame, a mount, and a boom, wherein the boom retains a workpiece, such as a mower, about its free end and is rotationally attached to a pivotal mount at its other end. The pivotal mount or rocker arm is attached to the frame and permits the boom and workpiece to be centered over the frame for transport. The entire assembly preferably is mounted on the back bed area of a truck or tractor.

9 Claims, 6 Drawing Figures

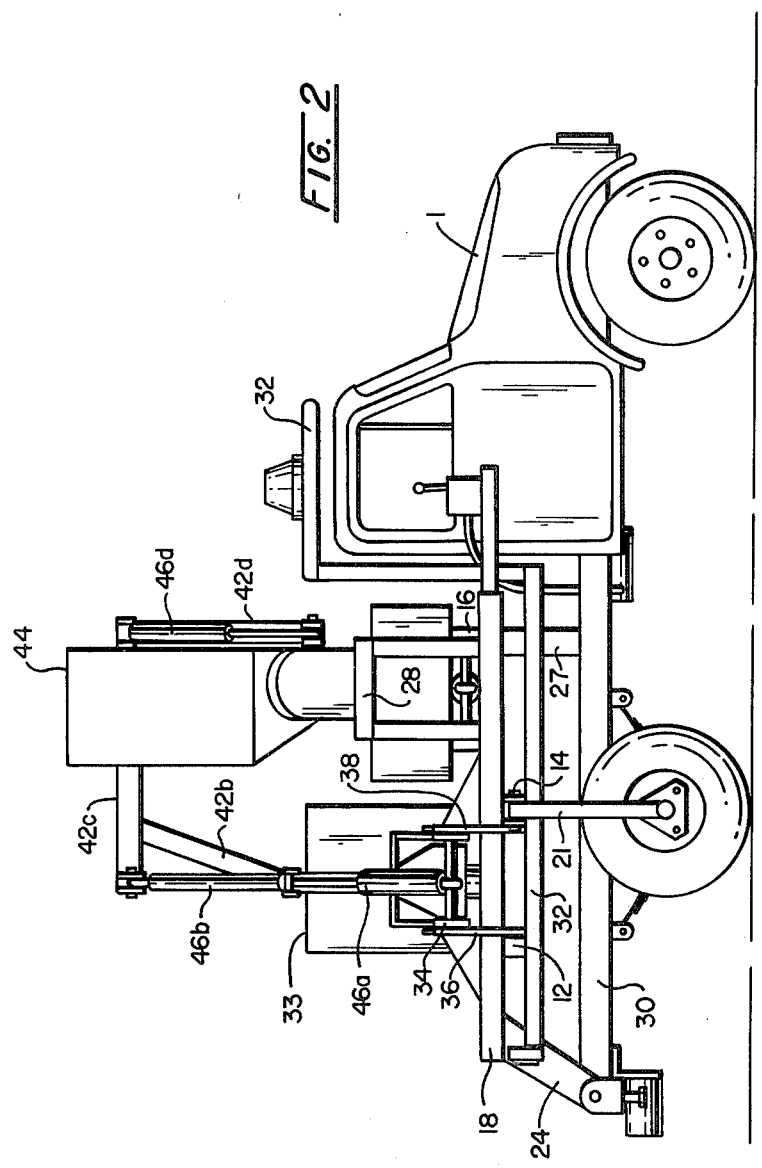

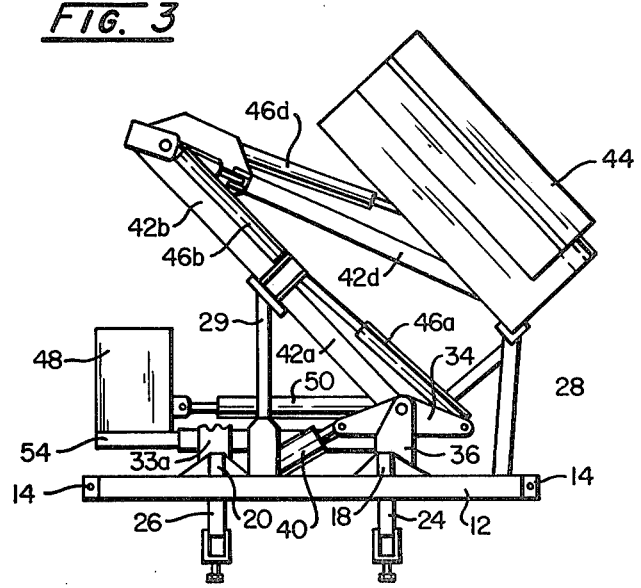
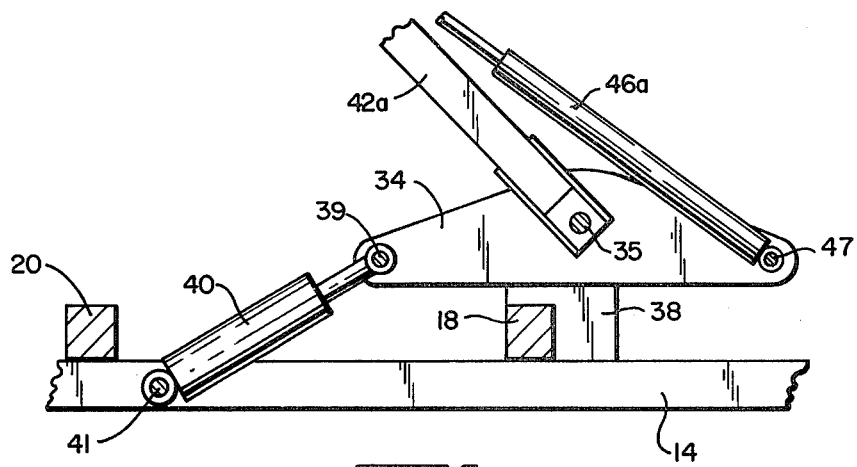

BOOM MOWER MOUNTING FRAME FOR OVER CENTER TRANSPORT

BACKGROUND OF THE INVENTION

The present invention relates to boom mowers attached to a tractor or the like and more particularly to a boom mower mounting frame which permits the boom and mower to be centered over the frame for transport of the assembly.

A variety of mowing devices suitable for attachment to a tractor or the like have been proposed in the prior art. The boom mower assembly riding on wheels may be attached to the back of a tractor, such as shown in U.S. Pat. Nos. 2,502,745 and 3,665,685. Alternatively, the boom mower assembly can be attached to the tractor so that the boom can be extended horizontally from the tractor for operation of the mower and then retracted to a vertical position for transport of the assembly. One problem with such boom mower assemblies is that the large mowing head cannot be centered over the tractor to permit safe transport of the assembly. More often, the center of gravity of the assembly is far to one side of the vehicle which makes transport cumbersome and often unsafe. The same is true for boom assemblies with other workpieces attached thereto.

Advantages of the present invention include the ability to center the boom and mowing head assembly over the center of the vehicle to which the assembly is attached for efficient and safe transport of the assembly. Also, the boom can be extended away from the vehicle for operation of the mowing head simply and efficiently.

BROAD STATEMENT OF THE INVENTION

The boom mower mounting frame of the present invention comprises in combination: a frame, a mount, and a boom. The boom has at least one section which is rotationally attached to said mount and which is capable of retaining a workpiece about its free end. Said section has means associated therewith for adjustably rotating said section about its point of attachment to said mount. The mount is pivotally attached to said frame and has means associated therewith for adjustably pivoting said mount about its pivotal attachment to the frame. The means which rotate the section of the boom attached to the mount and the means which pivot the mount are cooperatively operable for adjustably positioning the section attached to the mount horizontally and extending away from said frame for operation of said workpiece; for positioning said section attached to said mount over the frame at an angle of greater than 90° from said horizontal position, the workpiece capable of being positioned over the frame thereby; and for positioning the section attached to said mount at any position thereinbetween.

BRIEF DESCRIPTION OF THE DRAWINGS

FIG. 2 is a side view of the truck and boom mower mounting frame assembly of FIG. 1 with the boom and mower being in their transport or storage position.

FIG. 3 shows the rear view of the assembly only of FIG. 2.

FIG. 5 is an exploded cross sectional view through the center of the mount of FIG. 3.

The drawings will be described in connection with the description of the invention which follows.

DETAILED DESCRIPTION OF THE INVENTION

Figure 4:
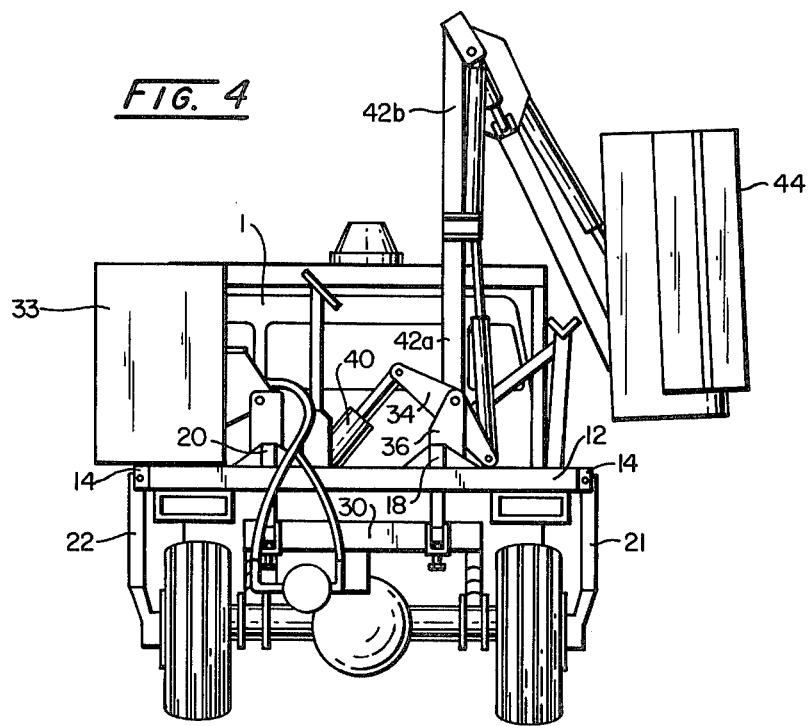
FIG. 4 shows a rear view of the truck, frame, mount, and boom with the boom being in a vertical position.

A unique feature of the boom mount assembly of the present invention is that it permits the boom to be adjustably positioned over the frame for safe and efficient transport of the boom and workpiece. Also, such mount assembly permits the boom to be rotated or pivoted from such over center position to a position extending horizontally away from the truck for operation of the workpiece. The preferable workpiece attached to the boom is a mower. Such mount and boom assembly permits mowing of grass, trimming of hedges and the like to be conducted at a distance from a truck or tractor upon which the entire assembly is mounted. Without the boom being mounted to the pivotal mount, the boom only can be positioned for transport vertically from its point of attachment to the frame. As can be seen in FIG. 4, the boom and workpiece in such position is not centered over the frame and truck so that transport in such position is cumbersome at best and frequently can be unsafe.

While the boom, mount, and frame assembly can be arranged in various fashions, a presently preferred assembly is shown in the drawings. Truck or tractor 1 shown in the drawings is conventional and will not be described in detail. Also, the allied hydraulic systems for operation of the mount and boom members are to be provided in conventional fashion. Accordingly, controls, lines, valves, and the like which form the hydraulic system are to be provided in conventional fashion depending upon the requirements of the particular boom assembly and workpiece utilized. While the boom, mount, and frame can be placed on a trailor and pulled behind a vehicle, preferably such assembly is mounted on the back of a truck or tractor such as shown in the drawings.

The invention will be described in detail referring to FIGS. 1 and 2 with appropriate further details provided by FIGS. 5 and 6 where indicated. FIGS. 3 and 4 will be referred to for illustration of particular features of the invention especially in regard to operation of the boom mounting frame assembly. The boom and mower shown in the drawings is a BUSHWHACKER flail cutter (Bomford and Evershed Ltd., Salford Priors, England) which was modified according to the precepts of the present invention. This particular boom and mower assembly is shown and described herein to illustrate the present invention and is not a limitation of the present invention.

The frame is composed of several steel members welded together at right angles though such members could be bolted together or otherwise attached. The frame includes transverse members 12, 14 and 16; and longitudinal members 18 and 20. The frame is attached to the tractor by means of struts 21 and 22 which are attached to the axle of the tractor, struts 24 and 26 which are attached to frame 30 of the tractor, and struts 27 (only one strut 27 shown in FIG. 2) which also are attached to frame 30 of the truck. Sub-frame 32 essentially is a cage which protects the frame and cab of the tractor, and the boom mower mounting frame rests on sub-frame 32.

The mount assembly to which the boom is attached is composed of rocker arm 34, mount sections 36 and 38 and piston and cylinder unit 40 which is associated with rocker arm 34. Such mount assembly preferably is welded onto the frame members of the boom mounting frame assembly, though the mount assembly may be fastened to the frame, for example, by bolts, or in any other conventional fashion. The boom is composed of sections 42a, 42b, 42d, and 42c (FIG. 2) and have associated therewith piston and cylinder units 46a, 46b, 46d, and 46c (not shown in the drawings), respectively. The boom sections preferably are rotationally attached to each other and the associated piston and cylinder units are for rotating such boom sections around their point of attachment. Workpiece 44 shown in the drawings preferably is a mower, though other workpieces suitably can be attached to the ultimate boom section about its free end. Boom supports 28 and 29 are welded to the boom mounting frame and retain the boom and workpiece when the boom and workpiece are in a storage or transport position such as shown in FIG. 3. In FIG. 1, hydraulic unit 33 is conventional and is for operation of the various piston and cylinder units associated with the boom. Hydraulic unit 33 is attached to the frame by piece 33a shown cut away in FIG. 3. Counterweight 48 shown in FIG. 1 will be described in detail in connection with FIG. 6 later.

Figure 1:
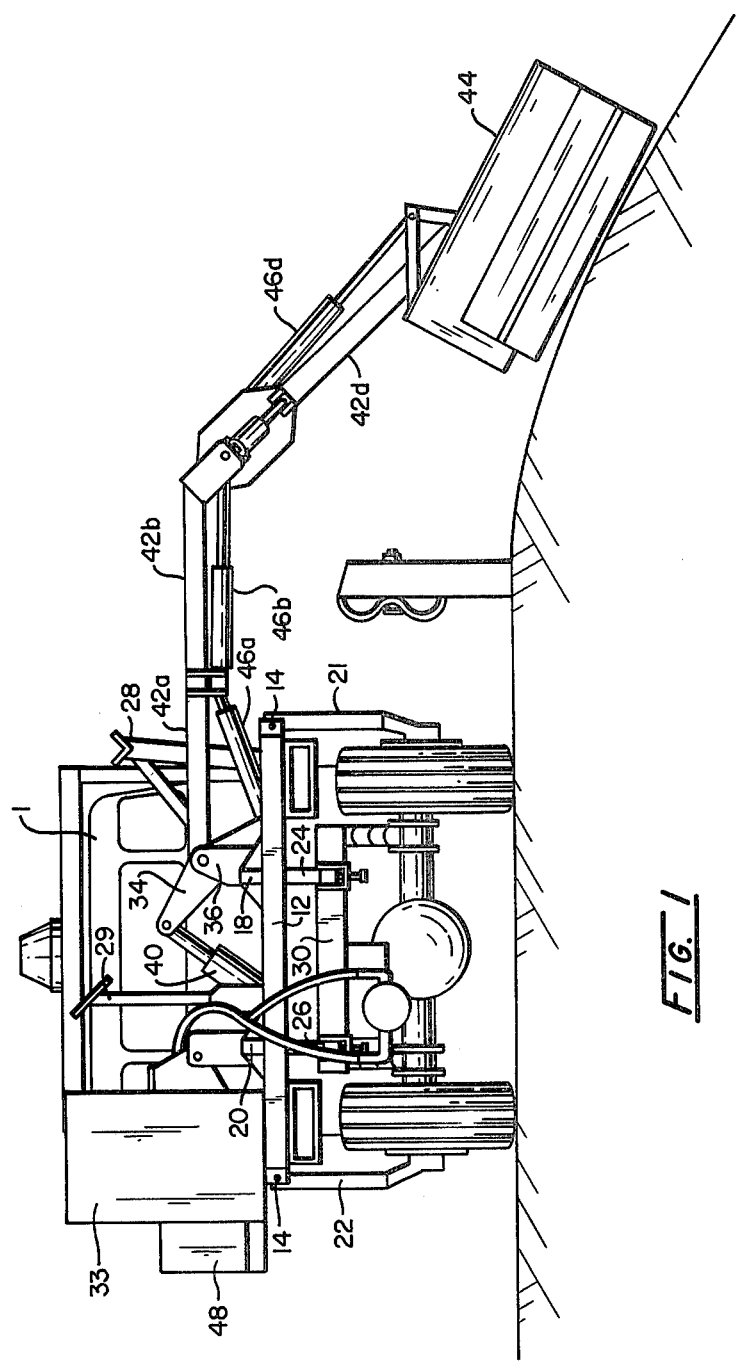
FIG. 1 is a rear view of a truck or tractor having the boom, mount, and frame assembly attached thereto and the mower in its operating position.

In FIG. 1, the boom sections 42a and 42b are shown in a horizontal position for operation of workpiece 44. In FIG. 3, the boom and workpiece are shown in the transport or storage position wherein a section of the boom rests on boom support 29 and the workpiece rests on boom support 28. Boom support 28 as shown in FIG. 2 is composed of two vertical struts upon which is mounted an angle iron for retaining workpiece 44. Associated with the vertical supports of boom support 28 are angle supports which are attached to the boom mounting frame members.

FIG. 3 shows the frame, mount, and boom combination of the present invention with the boom and workpiece 44 in their transport position. The preferred counterweight system also is shown in FIG. 3. For a more detailed illustration of the mount, refer to FIG. 5. As shown in FIG. 5, boom section 42a is rotationally attached between rocker arm pieces 34 by pin 35. Rocker arm 34 also pivots about pin 35 between mount sections 36 and 38. Unit 46a is rotationally attached between mount pieces 34 by pin 47. Unit 40 is rotationally attached between frame members 12 and 14 by pin 41 and its associated rod rotationally attached to rocker arm 34 by pin 39. When the boom and workpiece are in storage or transport position, such as shown in FIGS. 3 and 5, the rod from piston and cylinder unit 46a is fully (or almost fully) extended and the rod from piston and cylinder unit 40 is fully (or almost fully) within such cylinder unit. The boom can be placed in a vertical position such as shown in FIG. 4 by activating unit 40 which causes rocker arm 34 to pivot around pin 35 (its attachment to mount sections 36 and 38). The boom then may be rotated from such vertical position to a horizontal position, such as shown in FIG. 1 for operation of the workpiece, by activating unit 46a for movement of the rod and piston into the cylinder of unit 46a. Thus, the full rotation of the boom from its horizontal working position to its transport position is accomplished by a combination of units 46a and 40 with the appropriate pivoting of rocker arm 34. Without the pivoting of rocker arm 34, boom section 42a can only be placed in the vertical position as shown in FIG. 4. Therefore, unit 40 and pivoting rocker arm 34 permit boom section 42a to be rotated through an angle of greater than 90° from the horizontal working position of section 42a such as shown in FIG. 1. It should be understood that the boom need not be in the horizontal position for operation of the workpieces. In fact, the workpiece can be operated with the boom in any position if desired.

Figure 6:
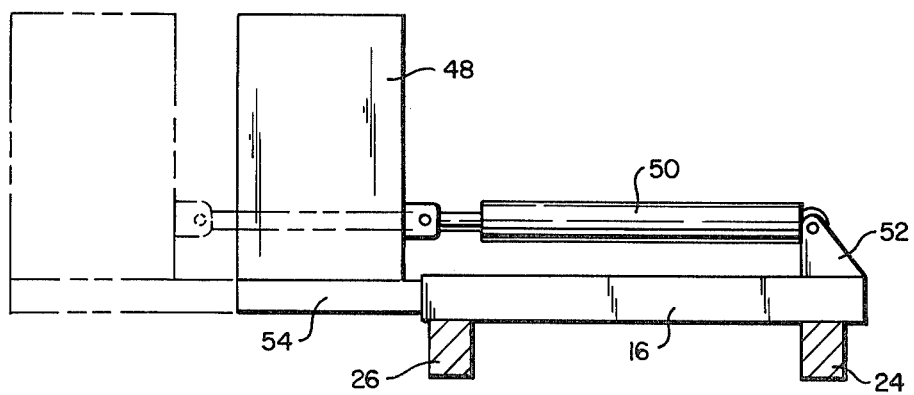
FIG. 6 is a rear view of a counterweight assembly attached to the frame.

Referring to FIG. 6, advantageously, the boom mounting frame has a counterweight system disposed on the frame at a position on the side of the frame opposite the side whereat the boom is extended in its working position away from the frame. Such counterweight assembly is composed of counterweight 48 which is attached to piston and cylinder unit 50 which unit is attached to frame member 16 by mount 52. Counterweight 48 also is attached to slide arm 54 which slides out of frame member 16 for extending the counterweight away from the boom mounting frame. Unit 50 is cooperatively operable with units 40 and 46a, either manually or automatically, for unit 50 to have its associated piston and rod moved out from the cylinder for extending counterweight 48 away from the frame so as to balance the weight of the boom and workpiece about the frame. The extension of counterweight 48 during the operation of the workpiece can be seen in FIG. 1.

It will be appreciated that various other arrangements and modifications of the boom mounting frame to the tractor or truck can be envisioned, as well as other arrangements for mounting and placement of the mount assembly and the associated piston and cylinder units thereto.

While the boom can be composed of only one section rotationally attached to the pivoting mount, usually there are two or more sections (preferably 2 to 5 sections) wherein each of the sections is rotationally attached to each other. Also, workpieces other than the preferred mower shown in the drawings can be attached to the ultimate boom section about its free end.

I claim:

1. In combination, a frame, a mount, and a boom;
said boom having at least one section attached to said mount at one end and capable of retaining a mowing unit about its free end, means pivotally attached to said section and said mount for adjustably rotating said section about its point of attachment to said mount, the axis of said rotation being horizontal,
said mount being pivotally attached to said frame about a first pivot point and having means associated therewith for adjustably pivoting said mount about its pivotal attachment to said frame, the associated means being attached to said mount at a second pivot point, the axis of rotation of said second pivot point being horizontal,
said mount pivoting means being cooperatively operable for adjustably positioning said boom section about said first pivot point to (1) a generally horizontal position extending away from said frame for operation of said mowing unit and (2) over the frame at an angle of greater than 90° from said horizontal position, said mowing unit and said boom being positioned over said frame thereby, and the frame being mounted on a vehicle having at least two axles and said frame being directly connected to one of said axles.

2. The combination of claim 1 wherein said boom has between two and five sections, each section being rotationally attached to each other and said sections have adjustable rotating means associated therewith.

3. The combination of claim 2 wherein each of said means is a piston and cylinder unit.

4. The combination of claim 1 wherein said frame additionally has a first support member for supporting said boom section attached to said mount and a second support member for supporting said mowing unit when said boom section attached to said mount is in said greater than 90° angle position.

5. The combination of claim 4 wherein said pivoting means for said mount is capable of rotating said mount, and thus said boom section attached to said mount, from said greater than 90° angle position to a 90° angle position from said horizontal position, and said rotating means for said boom section attached to said mount is capable of rotating said boom section from said 90° position to said horizontal position, both of said means capable of rotating said boom section between about 110° and 160° from said horizontal position.

6. The combination of claim 5 wherein said frame also has attached thereto an adjustable counterweight having a piston and cylinder unit associated therewith for moving said counterweight away from said frame to counter balance said boom and mowing unit when said boom section attached to said mount is in a position from between said horizontal position and a position about 90° from said horizontal position.

7. The combination of claim 1 wherein said frame also has attached thereto an adjustable counterweight having a piston and cylinder unit associated therewith for moving said counterweight away from said frame to counter-balance said boom and mowing unit when said boom section attached to said mount is in a position from between said horizontal position and a position about 90° from said horizontal position.

8. The combination of claim 1 wherein each of said means is a piston and cylinder unit.

9. The combination of claim 1 wherein said pivoting means for said mount is capable of rotating said mount, and thus said boom section attached to said mount, from said greater than 90° angle position to a 90° angle position from said horizontal position, and said rotating means for said boom section attached to said mount is capable of rotating said boom section from said 90° position to said horizontal position, both of said means capable of rotating said boom section between about 110° and 160° from said horizontal position.

* * * * *